(12) United States Patent
Glohr et al.

(10) Patent No.: US 12,083,884 B2
(45) Date of Patent: Sep. 10, 2024

(54) VEHICLE COMPONENT, VEHICLE AND METHOD FOR COMMUNICATION BETWEEN A VEHICLE AND A USER

(71) Applicant: Bayerische Motoren Werke Aktiengesellschaft, Munich (DE)

(72) Inventors: Tobias Glohr, Munich (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 755 days.

(21) Appl. No.: 17/265,320

(22) PCT Filed: Jul. 8, 2019

(86) PCT No.: PCT/DE2019/100639
§ 371 (c)(1),
(2) Date: Feb. 2, 2021

(87) PCT Pub. No.: WO2020/025085
PCT Pub. Date: Feb. 6, 2020

(65) Prior Publication Data
US 2021/0229554 A1 Jul. 29, 2021

(30) Foreign Application Priority Data
Aug. 3, 2018 (DE) .................. 10 2018 213 031.0

(51) Int. Cl.
*B60K 35/00* (2024.01)
*B60K 35/10* (2024.01)
*B60K 35/22* (2024.01)

(52) U.S. Cl.
CPC .............. *B60K 35/00* (2013.01); *B60K 35/10* (2024.01); *B60K 35/22* (2024.01);
(Continued)

(58) Field of Classification Search
CPC .... B60K 35/00; B60K 37/06; B60K 2370/10; B60K 2370/141; B60K 2370/12;
(Continued)

(56) References Cited

U.S. PATENT DOCUMENTS

| 2004/0189187 A1* | 9/2004 | Chang | H10K 50/86 |
| | | | 313/506 |
| 2005/0119799 A1* | 6/2005 | Dupont | B60K 37/02 |
| | | | 701/1 |

(Continued)

FOREIGN PATENT DOCUMENTS

| DE | 103 41 623 B3 | 10/2004 |
| DE | 10 2004 031 334 A | 1/2006 |

(Continued)

OTHER PUBLICATIONS

International Search Report (PCT/ISA/210) issued in PCT Application No. PCT/DE2019/100639 dated Sep. 18, 2019 with English translation (five (5) pages).

(Continued)

*Primary Examiner* — Russell Frejd
*Assistant Examiner* — Brandon Z Willis
(74) *Attorney, Agent, or Firm* — Crowell & Moring LLP

(57) ABSTRACT

A vehicle component includes a display element and/or operating element integrated into a vehicle component surface. The display element and/or operating element has a light source, a base support, a mask and a surface layer. The surface layer is made of a material that becomes transparent when activated.

14 Claims, 2 Drawing Sheets

(52) U.S. Cl.
CPC ............... *B60K 2360/141* (2024.01); *B60K 2360/1446* (2024.01); *B60K 2360/28* (2024.01); *B60K 2360/34* (2024.01); *B60K 2360/345* (2024.01); *B60K 2360/691* (2024.01)

(58) Field of Classification Search
CPC ...... B60K 2370/143; B60K 2370/1434; B60K 2370/1438; B60K 2370/1446; B60K 2370/145; B60K 2370/152; B60K 2370/195; B60K 2370/27; B60K 2370/28; B60K 2370/339; B60K 2370/34; B60K 2370/345; B60K 2370/682; B60K 2370/688; B60K 2370/691; B60K 2370/692; B60K 2370/774; B60K 2370/782; B60K 2370/794; B60W 50/14; B60W 2050/146; G02F 1/157; G02F 1/15; G02F 1/0147; G02F 1/015
See application file for complete search history.

(56) References Cited

U.S. PATENT DOCUMENTS

2015/0036204 A1* 2/2015 Branda ............... G02B 26/02
359/244
2016/0303971 A1* 10/2016 Kaysser ............... G06F 3/044
2017/0045737 A1* 2/2017 Cammenga .......... G02B 5/3058
2018/0149777 A1* 5/2018 Brown ................. G02F 1/153

FOREIGN PATENT DOCUMENTS

| DE | 10 2013 018 989 A1 | 5/2015 |
| DE | 10 2013 222 940 A1 | 5/2015 |
| DE | 10 2018 100 547 A1 | 4/2018 |
| JP | 62-81689 A | 4/1987 |

OTHER PUBLICATIONS

German-language Written Opinion (PCT/ISA/237) issued in PCT Application No. PCT/DE2019/100639 dated Sep. 18, 2019 (five (5) pages).

German-language Search Report issued in German Application No. 10 2018 213 031.0 dated May 29, 2019 with partial English translation (15 pages).

* cited by examiner

VEHICLE COMPONENT, VEHICLE AND METHOD FOR COMMUNICATION BETWEEN A VEHICLE AND A USER

BACKGROUND AND SUMMARY OF THE INVENTION

The present invention relates to a vehicle component, a vehicle and a method for communication between a vehicle and a user of the vehicle, wherein the vehicle is designed in particular as a motor vehicle.

Various display elements and control elements are provided in the vehicle for communication and interaction between a user and a vehicle. Symbols indicating the activation or deactivation of individual vehicle functions, such as whether a light is switched on or not or whether an airbag is functional or not, are displayed by display elements, for instance. Owing to the plurality of display elements and control elements provided in a vehicle, there is a desire to integrate these display elements and control elements into the surfaces of the vehicle interior and thus improve the esthetics. Moreover, display elements and control elements should at best only be visible if they are intended to provide the user with information or perform a function.

DE 102013018989 A1 discloses switches which have through openings in the material and comprise a light source which illuminate the switch from behind such that scattered light passes through the through openings and thus makes the switches visible. The disadvantage of this is that even when the light source is switched off, the switch is still visible as a switch and the requirements for an aesthetic surface are thus not met.

Based on this prior art, it is an object of the present invention to provide a vehicle component and a vehicle which have an attractive and aesthetic appearance thanks to the provision of a display element and/or control element whilst maintaining a high degree of functionality. Furthermore, it is an object of the present invention to provide a method for communication between a vehicle and a user of the vehicle which enables a high degree of user friendliness.

The object is achieved by means of a vehicle component according to the invention. The vehicle component comprises a display element and/or control element integrated into a vehicle component surface. A display element is understood in accordance with the present invention to mean an information box which provides, for example, information about a vehicle state or a current driving situation. Although the display element is thus used for the communication with a user of the vehicle, it is not intended to interact with the user and thus identify inputs by a user and trigger any other functions on this basis. By contrast, a control element comprises this functionality in accordance with the present invention. The control element can, when activated, for example when touched by the user, trigger a function, such as activate a heating element, control a volume or switch a light on. Moreover, there is also the option of providing a combined display and control element, which both displays information and enables a function to be activated following interaction with the user.

The display element and/or control element comprises a light source, a base support, a mask and a surface layer. The surface layer is in this case an area facing the surface of the vehicle component and is thus the so-called "uppermost" layer, whilst the light source constitutes the lowermost layer, i.e. the layer facing away from the surface of the vehicle component. There are thus the following optional orders of layers:

light source/base support/mask/surface layer, or
light source/mask/base support/surface layer.

The light source is not restricted in detail and can, for example, comprise a light bulb, a discharge lamp or one or several light-emitting diodes. The light source is designed in this case such that it can mark the display element and/or control element.

The base support is not limited in detail either. It serves as a support for the mask arranged above or below and the surface layer and only has the property of letting light through to a sufficient extent. The base support thus has a certain transparency. The material of the base support is not restricted. It may, for example, be a decorative material that is designed such that light from the light source can pass through the base support. One exemplary embodiment of the base support is made of wood which is sputtered and thus has a sufficient transparency. A further advantageous material of the base support is transparent plastic or glass. Of these, glass is particularly preferred as it has a particularly low absorption and light scattering.

The mask is an element that conveys information to the user of the vehicle. In other words, the mask is a symbolic element that stands for a specific display or operation of the display element and/or control element. The material, design and shape of the mask are substantially not restricted. By way of example, the mask may be a symbolic film or a more or less three-dimensional structure.

The surface layer comprises a material which becomes transparent through activation. This means that when the display element and/or control element is in an inactive state, i.e. in particular also when the light source is in an inactive state, i.e. when no light is emitted from the light source, the surface layer is not transparent and, for example, appears or is opaque, for instance as a reflective surface, or in the form of a colored layer. If the display element and/or control element is activated, the material of the surface layer becomes transparent, i.e. lets light pass through. Once the light source has been activated, light can thus pass through the base support, the mask and the surface layer starting from the light source. The material of the surface layer is also activated in this state. This means that the structure of the molecules of the surface layer and thus the orientation of the molecules has changed in comparison to the non-transparent, inactive state. Due to the transparency of the surface layer in the activated state, the mask beneath and the associated information become visible. The display element and/or control element can thus be perceived as such through the visual perceptibility of the mask present in the form of a symbol, or in particular the information content of the symbol conveyed by the display element and/or control element can be perceived when the display element and/or control element is/are in the activated state.

As a result of this functionality of the display element and/or control element used according to the invention, good aesthetics are achieved with high functionality, very good communication potential and integration of the display element and/or control element into a vehicle component surface of the vehicle component according to the invention, as the mask and layers below are not visible when the display element and/or control element is/are in the inactivated state and the surface of the display element and/or control element visually blend in with the surrounding surfaces of the vehicle component as a result of its lack of transparency. This also enhances the safety of a vehicle which comprises the vehicle component according to the invention as an excessive number of visual stimuli through display elements and control elements adversely affects the user's ability to concentrate. The vehicle component is thus also characterized by an appealing and user-friendly interior design, which is enhanced by the selective ability to activate the display element and/or control element.

According to one advantageous further development, the mask comprises a solid shape of a symbol or a grid of holes of a symbol. In the case of a solid shape, the contours of the mask substantially become visible as a result of the light emitted from the light source. On the one hand, this can mean that the light does not pass directly through the mask, but rather only reaches the surface of the display element and/or control element in surrounding areas of the mask, such that the symbol of the mask can be recognized by the fact that the symbol itself is not illuminated. On the other hand, this can mean that light only reaches the surface of the display element and/or control element in the region of the symbol, e.g. when the symbol is formed by removing corresponding areas of the material of the mask. Light from the light source thus only passes through the missing parts in the material of the mask that have been formed into a symbol.

In the case of a symbol formed by a grid of holes, light passes selectively through the holes provided, which also allows the symbol to be depicted as an overall image. The symbol thus results from a plurality of light-filled holes, which constitute cut-outs in the material of the mask.

Another advantageous further development provides that the light source, the base support and the mask form a unit. This creates a compact structure of the display element and/or control element such that the display element and/or control element can be very easily integrated into the vehicle component surface. The light source, base support and mask, and possibly also the surface layer, are particularly advantageously designed in the form of a display, in particular in the form of an LCD display or an OLED. In order to enable an operating function, i.e. an interaction between a user and the display element and/or control element, the display can also comprise an input device, which may be in the form of a touchscreen, for instance.

The display element and/or control element can further advantageously comprise a heat source, a light source and/or a voltage source to activate the surface layer, i.e. to form the transparency of the surface layer. The appropriate energy source depends in this case on the material of the surface layer. By way of example, a material can become transparent when selectively increasing or reducing the temperature. These are thus thermochromic materials. Other materials exhibit such behavior with exposure to light of a certain wavelength or when a voltage is applied. If the material of the surface layer becomes transparent due to exposure to higher temperatures and/or due to exposure to light, this can advantageously be achieved by activating the light source. For this purpose, the light source can give off heat in one case, for example in the form of infrared radiation, and emit light of a certain wavelength in another case.

Owing to the selective controllability, which is independent of the light source, the material of the surface layer is in particular an electrochromic material. This means that the material becomes transparent by applying a voltage. The material thus has the capability of changing its visual properties when an external electric field is applied. According to the present invention, the material becomes transparent when an electric field is applied.

In order to further improve the esthetics of the vehicle component, it is advantageously provided that a surface of the display element and/or control element is aligned with a surface of the vehicle component. The corresponding surfaces are thus adjacent to one another in such a manner that there is no offset between them and the display element and/or control element blend in with the surrounding surfaces in a visually appealing way. The display element and/or control element is particularly advantageously integrated into a center console, a dashboard or a steering wheel such that a surface of the display element and/or control element is aligned with a surface of the center console, dashboard or steering wheel.

Further advantageously in light of the visual properties, a surface of the display element and/or control element is a constituent part of a center console, a decorative element, such as a trim strip, a dashboard, an instrument panel, inside paneling or a door panel and thus seamlessly blends in with the visual appearance of these components.

Furthermore in accordance with the invention, a vehicle is also described, which is in particular designed as a motor vehicle and which comprises a vehicle component as described above. As a result of the vehicle component according to the invention being integrated into the vehicle, a very high level of user comfort with good esthetics is achieved alongside very good communication between a user and the vehicle via the display element and/or control element integrated into the vehicle component.

Furthermore in accordance with the invention, a method for communication between a vehicle and a user of the vehicle is also described. The method first comprises a step of detecting a user approaching a surface layer or the user touching the surface layer. Appropriate sensors can be provided for this purpose. In response to this detection, a display element and/or control element integrated into a vehicle component surface is activated, which element is configured to communicate with the user and for this purpose has a light source, a base support, a mask and the surface layer. The layer arrangement can in this case be designed as above for the vehicle component according to the invention. The surface layer thus forms the uppermost layer, which is surrounded by the surroundings of the display element and/or control element such that approaching the surface layer or touching this surface layer is straightforward and rather convenient owing to the easy accessibility. The surface layer in this case has the property of becoming transparent in response to the display element and/or control element being activated. By using the method according to the invention, the user can very easily initiate and establish communication with the display element and/or control element. Once the display element and/or control element has been activated, and thus in particular also once the light source has been activated and the surface layer has become transparent, the mask becomes visible or recognizable. Information can thus be communicated to the user via a corresponding symbol and, if necessary, a further function can be triggered by operating the control element. The method can be easily implemented without much technical effort.

In terms of the design of the display element and/or control element, reference can additionally be made to the embodiments relating to the vehicle component according to the invention. Indeed, the method according to the invention is also suitable for operating the vehicle according to the invention. The advantages, advantageous effects and further developments are thus mutually applicable.

One advantageous further development of the method according to the invention is characterized in that the activation of the display element and/or control element comprises a step of activating the light source. In this way, it becomes very clear whether a display element and/or control element is operational or activated.

The surface layer further advantageously comprises an electrochromic material or a thermochromic material and the method is characterized by the further advantageous embodiment in which the activation of the display element and/or control element comprises a step of applying a voltage to the surface layer or exposing it to a predetermined temperature. In this way, the transparency of the surface layer can be controlled in a particularly simple and targeted manner.

Further details, features and advantages of the invention are given in the following description and the figures.

DETAILED DESCRIPTION OF THE DRAWINGS

Figure 1:
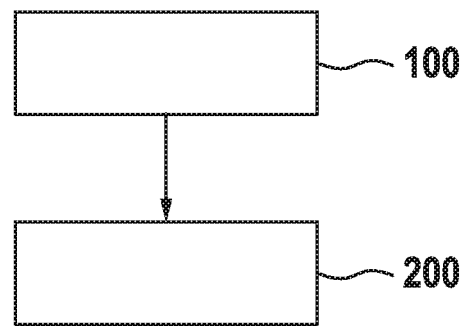
FIG. 1 is a schematic diagram illustrating method steps of a method for communication between a vehicle and a user of the vehicle according to one embodiment of the invention.

The schematic diagram shown in FIG. 1 shows a first method step 100, namely detecting a user approaching a surface layer or the user touching the surface layer. The surface layer is a constituent part of a display element and/or control element. Appropriate sensors can be provided to identify and thus detect the approaching or contact. In response to the process of detecting a user approaching the surface layer or the user touching the surface layer, the display element and/or control element integrated into a vehicle component surface is activated in method step 200.

The display element and/or control element comprise(s) here, by way of example, in this order a light source, a base support, a mask and the surface layer, wherein the surface layer becomes transparent in response to the display element and/or control element being activated. The activation process can, for example, be triggered by activating the light source.

In other words, activating the display element and/or control element not only activates the light source, but also the surface layer, and in such a way that the material of the surface layer changes its structure, particularly on a molecular level, e.g. molecules in the material realign themselves, such that they change from an opaque appearance to a transparent state. This process can, for example, be triggered by applying a voltage, such as in the case of electrochromic materials. Alternatively, this process can be triggered by changing the temperature, such as in the case of thermochromic materials.

As a result of the surface layer becoming transparent, at least the layer below becomes visible, i.e. the mask, which can be designed in the form of a solid mask or a mask with holes, and which is designed such that it displays a symbol by means of illumination through the radiation of the light source, which symbol has a certain information content for the user. In addition, the transparency can cause a control panel of a control element to become visible, by means of which a function can be triggered through interaction with the user.

When the display element and/or control element is in the inactive state, i.e. when the light source is switched off and the surface layer is not transparent, the display element and/or control element is not visible and blends in with the surrounding surfaces of the vehicle. The surface layer can then, for example, be present in the form of a colored layer.

The method enables simple and convenient communication between a user of a vehicle and the vehicle. Moreover, the user is not distracted by permanent visual sensory overload as a result of display elements and/or control elements which are illuminated or lit up, and can, for example, better concentrate on driving.

Figure 2:
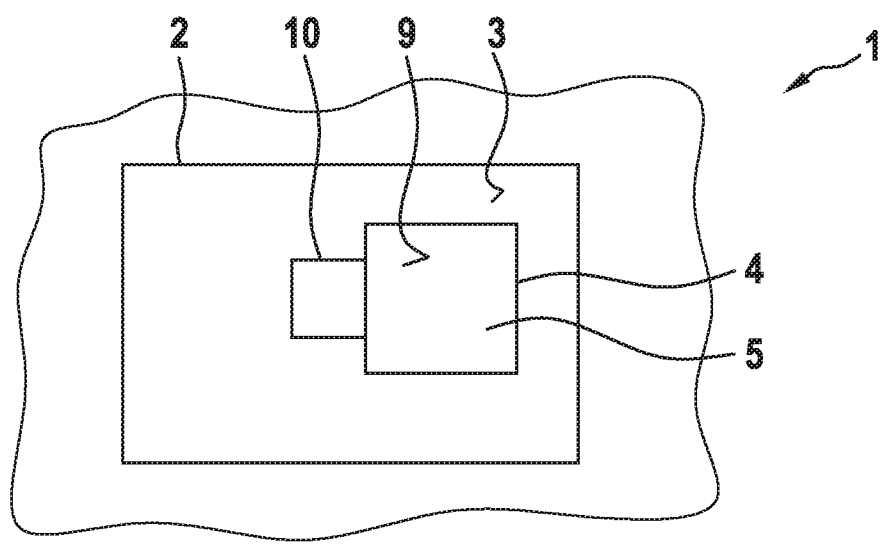
FIG. 2 shows a part of a vehicle according to one embodiment of the invention.

FIG. 2 shows a part of a vehicle 1 according to one advantageous embodiment of the invention. The vehicle 1 in this case is in particular designed as a motor vehicle.

A vehicle component 2, which comprises a surface 3, into which a display element and/or control element 4 is integrated, is shown in detail. A surface of the display element and/or control element 4, which is designed in the form of a surface layer 5, is aligned with the surface of the vehicle component 3, such that the surface 9 of the display element and/or control element 4 is flush with the surface 3 of the vehicle component 2 and is thus arranged so as neither to protrude nor be recessed or raised with an offset.

In this embodiment, the display element and/or control element 4 comprises, for example, in this order a light source 6, a base support 7, a mask 8 and the surface layer 5. The surface layer 5 comprises a material which becomes transparent through activation.

Figure 3:
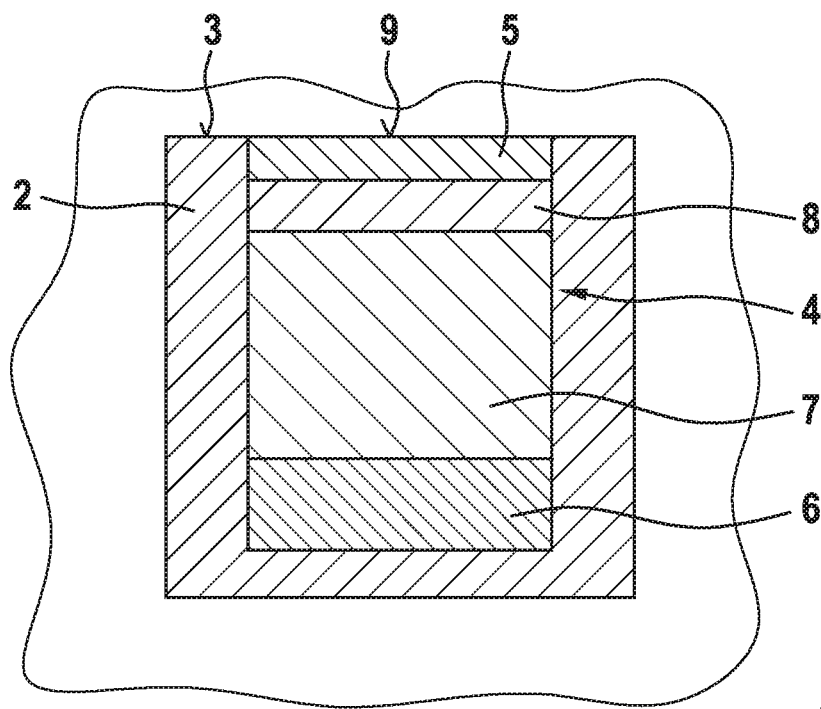
FIG. 3 is a sectional view of the part of the vehicle from FIG. 2.

With regards to the layer arrangement of the display element and/or control element 4, reference is made to FIG. 3, which shows the individual layers and their arrangement in section.

The mask 8 can comprise a solid shape of a symbol or a grid of holes of a symbol and is visible when the display element and/or control element 4 is in the activated state, i.e. when the light source 6 is switched on and the surface layer 5 is transparent. The light emitted by the light source 6 can pass through the solid mask or through the mask with holes or, however, reproduce the contours of a solid mask.

In order for the mask 8 to be sufficiently recognizable, light passes from the light source 6 through the base support 7, which advantageously also has adequate transparency for this purpose and is made, for example, of glass. For instance, sputtered wood that is fine and fragmented such that a sufficient amount of light can pass through it can also be used as a material for the base support 7 as an alternative to glass. Sputtered wood also has an advantageous esthetic aspect.

The light source 6, the base support 7 and the mask 8 form in particular a unit and are preferably designed in the form of a display.

A voltage source 10, which can apply voltage to the surface layer 5, is also provided. This is in particular provided for the use of electrochromic materials in the surface layer 5, which selectively become transparent when a voltage is applied.

The vehicle is characterized by a high level of functionality due to the ability of the display element and/or control element 4 to be activated and also due to its inactive and thus nontransparent state, and blends in with the surface 3 of the vehicle component 2 in an esthetically pleasing manner. In the inactive state, the display element and/or control element 4 is not perceived as disruptive but rather as an integral constituent part of the vehicle component 2. The display element and/or control element 4 is thus preferably also a constituent part of the vehicle component 2, which is designed in particular as a center console, trim strip, dashboard, instrument panel, inside paneling or a door panel.

REFERENCE LIST

1 Vehicle
2 Vehicle component
3 Surface of the vehicle component
4 Display element and/or control element
5 Surface layer
6 Light source
7 Base support
8 Mask
9 Surface of the display element and/or control element
10 Voltage source

What is claimed is:

1. A vehicle component, comprising:
a display element and/or control element integrated into a vehicle component surface, wherein
the display element and/or control element has
a light source,
a base support,
a mask configured to block passage of light, and
a surface layer;
the surface layer comprises a material that becomes transparent through activation by application of a voltage to the surface layer or exposure of the surface layer to a predetermined temperature; and
the mask becomes visible when the light source is activated.

2. The vehicle component according to claim 1, wherein the mask comprises a solid shape of a symbol or a grid of holes of a symbol.

3. The vehicle component according to claim 1, wherein the light source, the base support, and the mask form a unit and are configured in the form of a display.

4. The vehicle component according to claim 1, wherein the display element and/or control element further comprises a heat source, a light source and/or a voltage source.

5. The vehicle component according to claim 1, wherein the material is an electrochromic material or a thermochromic material.

6. The vehicle component according to claim 1, wherein a surface of the display element and/or control element is aligned with a surface of the vehicle component.

7. The vehicle component according to claim 1, wherein a surface of the display element and/or control element is a constituent part of a center console, a trim strip, a dashboard, an instrument panel, inside paneling or a door panel.

8. A vehicle, comprising a vehicle component according to claim 1.

9. The vehicle component according to claim 1, wherein the mask is disposed between the base support and the surface layer.

10. The vehicle component according to claim 1, wherein the mask is disposed between the light source and the base support.

11. A method for communication between a vehicle and a user of the vehicle, comprising the steps of:
detecting a user approaching a surface layer or the user touching the surface layer, and in response thereto:
activating a display element and/or control element integrated into a vehicle component surface, comprising:
applying a voltage to the surface layer, or
exposing the surface layer to a predetermined temperature, wherein
the display element and/or control element has
a light source,
a base support,
a mask configured to block passage of light, and
the surface layer;
the surface layer becomes transparent in response to the activation of the display element and/or control element; and
the mask becomes visible in response to the activation of the display element and/or control element.

12. The method according to claim 11, wherein the activation of the display element and/or control element comprises a step of activating the light source.

13. The method according to claim 11, wherein the surface layer comprises an electrochromic material or a thermochromic material.

14. A vehicle component, comprising:
a display element and/or control element integrated into a vehicle component surface, wherein
the display element and/or control element has
a light source,
a base support,
a mask configured to block passage of light, and
a surface layer; and
the surface layer comprises a material that becomes transparent through activation by exposure of the surface layer to a predetermined temperature;
wherein the mask becomes visible when the light source is activated.

* * * * *